United States Patent
Lucas et al.

(10) Patent No.: US 9,864,044 B2
(45) Date of Patent: Jan. 9, 2018

(54) METHODS AND SYSTEMS FOR IMPROVING SIGNAL TO PHASE NOISE IN RADARS

(71) Applicant: Raytheon Company, Waltham, MA (US)

(72) Inventors: Michael E. Lucas, Tewksbury, MA (US); Raymond A. Roberge, Tewksbury, MA (US)

(73) Assignee: Raytheon Company, Waltham, MA (US)

( * ) Notice: Subject to any disclaimer, the term of this patent is extended or adjusted under 35 U.S.C. 154(b) by 582 days.

(21) Appl. No.: 14/314,331

(22) Filed: Jun. 25, 2014

(65) Prior Publication Data

US 2015/0378007 A1 Dec. 31, 2015

(51) Int. Cl.
| | |
|---|---|
| *G01S 13/50* | (2006.01) |
| *G01S 7/282* | (2006.01) |
| *G01S 7/35* | (2006.01) |
| *G01S 13/22* | (2006.01) |
| *G01S 13/58* | (2006.01) |

(52) U.S. Cl.
CPC .............. *G01S 7/282* (2013.01); *G01S 7/352* (2013.01); *G01S 13/22* (2013.01); *G01S 13/582* (2013.01); *G01S 13/584* (2013.01)

(58) Field of Classification Search
CPC .......... G01S 7/282; G01S 7/352; G01S 13/22; G01S 13/582; G01S 13/584; G01S 13/94; G01S 13/20; G01S 7/2921; G01S 7/4052; G01S 13/0209; A61B 8/06; H03B 1/04

USPC .......................................................... 342/175
See application file for complete search history.

(56) References Cited

U.S. PATENT DOCUMENTS

| | | | | |
|---|---|---|---|---|
| 3,369,231 A | * | 2/1968 | Foral ....................... | G01S 13/94 342/179 |
| 3,787,854 A | * | 1/1974 | Friedman ................ | G01S 13/56 342/28 |
| 4,137,533 A | * | 1/1979 | Briechle .................. | G01S 7/32 342/162 |
| 4,688,044 A | * | 8/1987 | O'Brien .................. | G01S 13/20 342/159 |
| 4,891,649 A | * | 1/1990 | Labaar .................. | G01S 7/2921 342/175 |
| 5,337,014 A | * | 8/1994 | Najle ..................... | G01R 29/26 324/613 |

(Continued)

OTHER PUBLICATIONS

Baghdady, E. J. et al. "Short-term frequency stability: characterization, theory, and measurement", Proc. IEEE, vol. 53, pp. 704-722, 1965.

(Continued)

*Primary Examiner* — Nuzhat Pervin
(74) *Attorney, Agent, or Firm* — Schwegman Lundberg & Woessner, P.A.

(57) ABSTRACT

Methods and systems that reduce the effect of phase noise in radar receivers. The received phase noise spectrum is modulated with periodic nulls due to the two way range delay function. The system and method include strategically positioning the nulls of the delay function to cancel portions of phase noise power spectral density, the portions of the power spectral density of the phase noise being selected so that effect of phase noise in radar sensitivity is reduced.

7 Claims, 14 Drawing Sheets

(56) References Cited

U.S. PATENT DOCUMENTS

| | | | | |
|---|---|---|---|---|
| 5,412,325 A * | 5/1995 | Meyers | G01R 29/26 | 324/613 |
| 5,483,962 A * | 1/1996 | Shiba | A61B 8/06 | 600/441 |
| 5,497,160 A * | 3/1996 | Koehler | G01S 13/325 | 342/127 |
| 5,519,400 A * | 5/1996 | McEwan | A61B 5/0507 | 342/28 |
| 5,661,439 A * | 8/1997 | Watkins | H03B 1/04 | 331/1 R |
| 6,529,568 B1 * | 3/2003 | Richards | H04B 1/719 | 370/286 |
| 6,833,808 B2 * | 12/2004 | Rees | G01S 13/534 | 342/159 |
| 6,914,949 B2 * | 7/2005 | Richards | H04B 1/719 | 370/230 |
| 7,379,017 B2 * | 5/2008 | Dwelly | G01S 13/18 | 342/118 |
| 8,248,297 B1 * | 8/2012 | Baker | G01S 7/4052 | 342/159 |
| 8,279,113 B2 * | 10/2012 | Ruggiano | G01S 7/4008 | 342/159 |
| 8,471,761 B1 * | 6/2013 | Hogg | G01S 13/0209 | 342/114 |
| 9,291,705 B2 * | 3/2016 | Nakagawa | G01S 7/292 | |
| 9,297,888 B2 * | 3/2016 | Lee | G01S 13/95 | |
| 9,372,259 B2 * | 6/2016 | Kishigami | G01S 7/2813 | |
| 2014/0016727 A1 * | 1/2014 | Simon | H03L 7/185 | 375/327 |
| 2015/0303929 A1 * | 10/2015 | Hamdane | H03L 7/085 | 327/105 |
| 2016/0012164 A1 * | 1/2016 | Minassian | G06F 17/5009 | 703/2 |

OTHER PUBLICATIONS

Long, W.H. et al. "Medium PRF for the An/APG-66 radar," Proceedings of the IEEE, pp. 301-311, 1985.

* cited by examiner

METHODS AND SYSTEMS FOR IMPROVING SIGNAL TO PHASE NOISE IN RADARS

BACKGROUND

This invention relates generally to methods and systems of improving signal to phase noise in radar systems.

Doppler radar identifies the velocity of an object by mixing the transmitted carrier with the wave reflected from the moving object and determining a small change in frequency. The source of phase noise affects the radar sensitivity.

In conventional systems, the power spectral density of phase noise is assumed to be flat in all but the zero Doppler region.

There is a need for methods and systems that reduce the effect of phase noise in radar receivers.

BRIEF SUMMARY

Methods and systems that reduce the effect of phase noise in radar receivers are described herein below.

In one embodiment, the received phase noise spectrum is modulated with periodic nulls due to the two way range delay function. Embodiments of the system and method of these teachings strategically position the nulls of the delay function to cancel portions of phase noise spectrum, the portions of the power spectral density of the phase noise being selected so that effect of phase noise in radar sensitivity is reduced. In one or more embodiments, the system employs a shared local oscillator in transmit and receive.

For a better understanding of the present teachings, together with other and further objects thereof, reference is made to the accompanying drawings and detailed description and its scope will be pointed out in the appended claims.

DETAILED DESCRIPTION

The following detailed description presents the currently contemplated modes of carrying out the invention. The description is not to be taken in a limiting sense, but is made merely for the purpose of illustrating the general principles of the invention.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

The "effect of phase noise in radar sensitivity," as used herein, refers to the effect of phase noise in adding to the noise in the system signal to noise ratio.

The following discussion is presented in order to provide for better understanding of the present teachings. Although different representations of the effects of a delay function are possible, while the present teachings should not be bound by theory or limited by one representation, one representation is presented below. The difference in phase angle between the signal transmitted to the object and the signal received from the object can be represented as $$\Delta\theta(t,t_d) = \theta(t+t_d) - \theta(t)$$

which can also be represented as $$\Delta\theta(t, t_d) = \theta(t) \text{ convolved with } p_{rect,t_d}\left(t + \frac{t_d}{2}\right)$$

Where $p_{rect,t_d(t)}$ is a rectangular pulse of unit height extending from $$\frac{t_d}{2} \text{ to } \pm \frac{t_d}{2}.$$

If the phase angle is expressed as $\theta(t) = 2\pi f_0 t + \varphi(t)$, where $\varphi(t)$ is the random fluctuation in phase, the standard deviation of the time delay is a function of the product of the spectral phase noise power density and $$\left(\frac{\sin\omega\frac{t_d}{2}}{\omega\frac{t_d}{2}}\right)^2.$$

Although the above discussion has been presented in terms of terms of a continuous system, a similar result could be presented for a pulsed system. The term $$\left(\frac{\sin\omega\frac{t_d}{2}}{\omega\frac{t_d}{2}}\right)^2$$

can be considered as arising from a delay function (also referred to as a filter function).

Figure 1A:
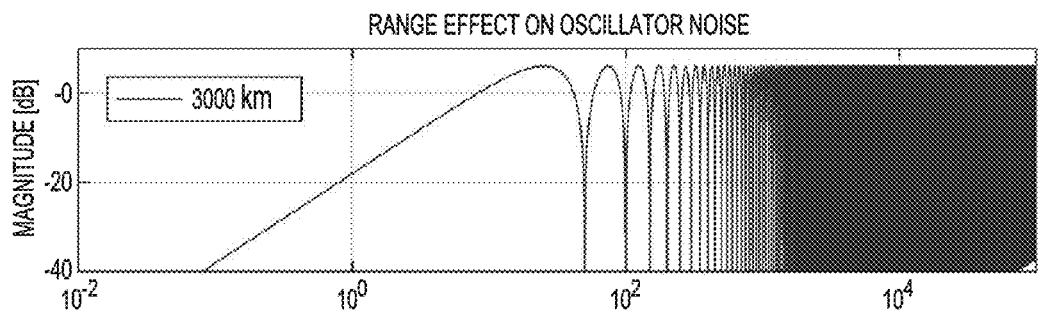
FIGS. 1A-1D are graphical representations of one embodiment of the two way range delay function as used in these teachings.
Figure 1B:
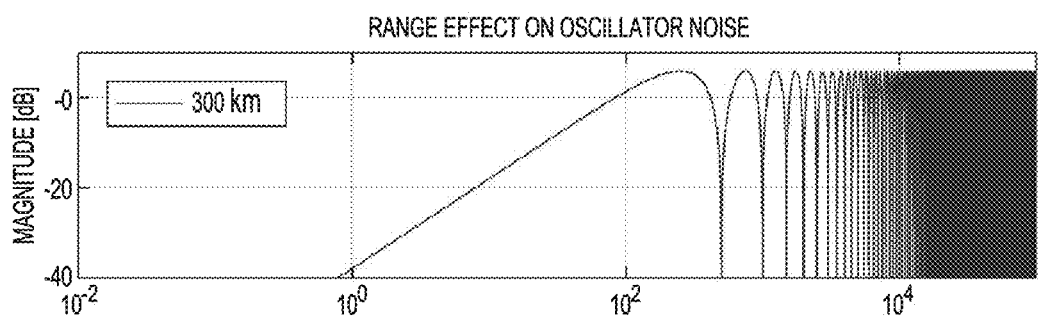
Figure 1C:
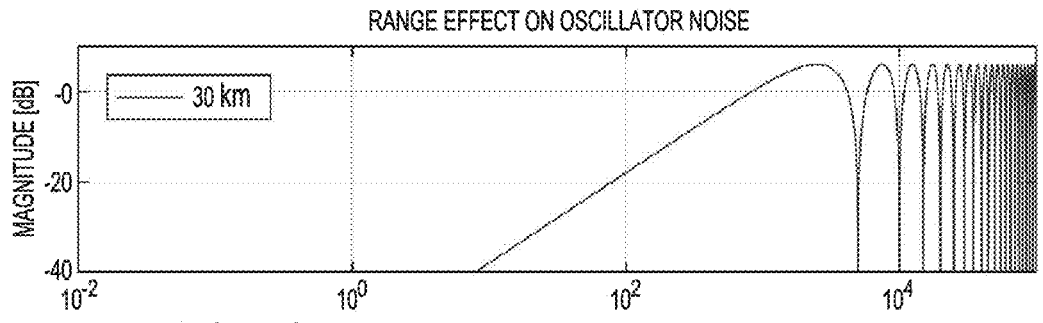
Figure 1D:
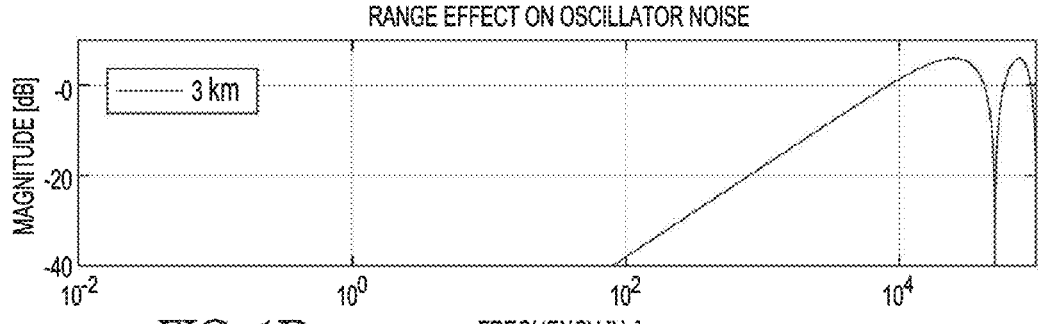
Figure 2:
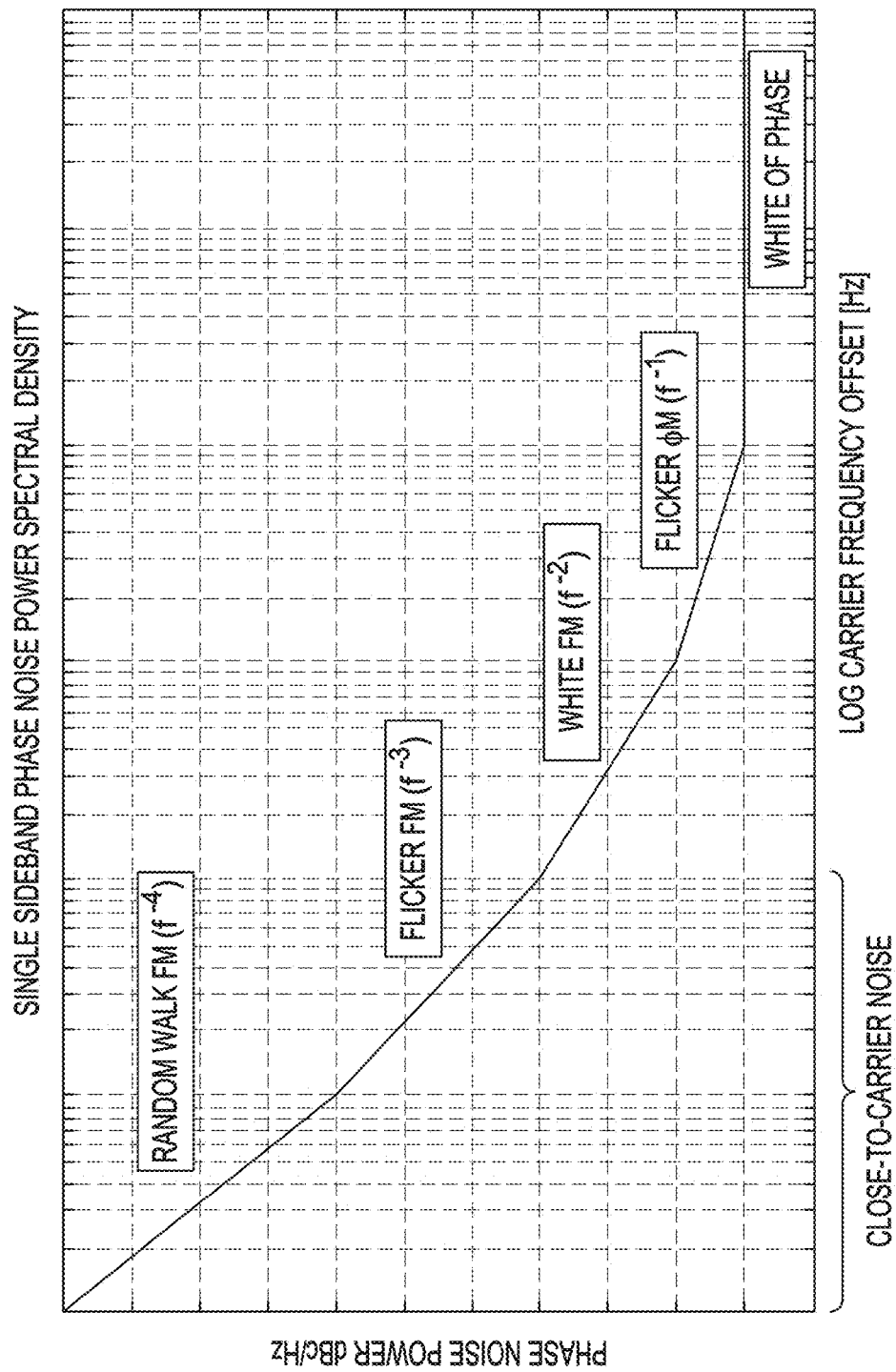
FIG. 2 is a graphical representation of one embodiment of the single sideband (SSB) phase noise spectral density as used in these teachings.

In one embodiment, the received phase noise spectrum is modulated with periodic nulls due to the two way range delay function (also referred to as a filter function). Embodiments of the system and method of these teachings strategically position the nulls of the delay function to cancel portions of phase noise spectrum, the portions of the power spectral density of the phase noise being selected so that effect of phase noise in radar sensitivity is reduced. FIGS. 1A-1D show graphical representations of one embodiment of the delay function as used in these teachings. FIG. 2 is a graphical representation of one embodiment of the phase noise spectral density as used in these teachings.

In one or more embodiments, the method of these teachings for increasing sensitivity of Doppler radar receivers includes selecting a determinator of nulls in a filter function multiplying a power spectral density of phase noise so as to position the nulls in order to cancel portions of the power spectral density of the phase noise; the portions of the power spectral density of the phase noise being selected so that effect of phase noise in radar sensitivity is reduced.

In one instance, the Doppler radar receivers are pulsed Doppler radar receivers; and the nulls in the filter function are determined by selecting a predetermined pulse repetition frequency (PRF). In one embodiment, the predetermined PRF is selected as a multiple of inverse time delay for a predetermined range. In another embodiment, the nulls in the filter function are also determined by an additional time delay, where a sum of the additional time delay and a time delay corresponding to the predetermined PRF is a multiple of a predetermined system delay time.

In another instance, the Doppler radar receivers are continuous wave (CW) Doppler radar receivers and the nulls in the filter function are determined by selecting a predetermined time delay.

In order to better illustrate these teachings, exemplary embodiments that are presented herein below. It should be noted that these teachings are not limited to only those exemplary embodiments.

Figure 3:
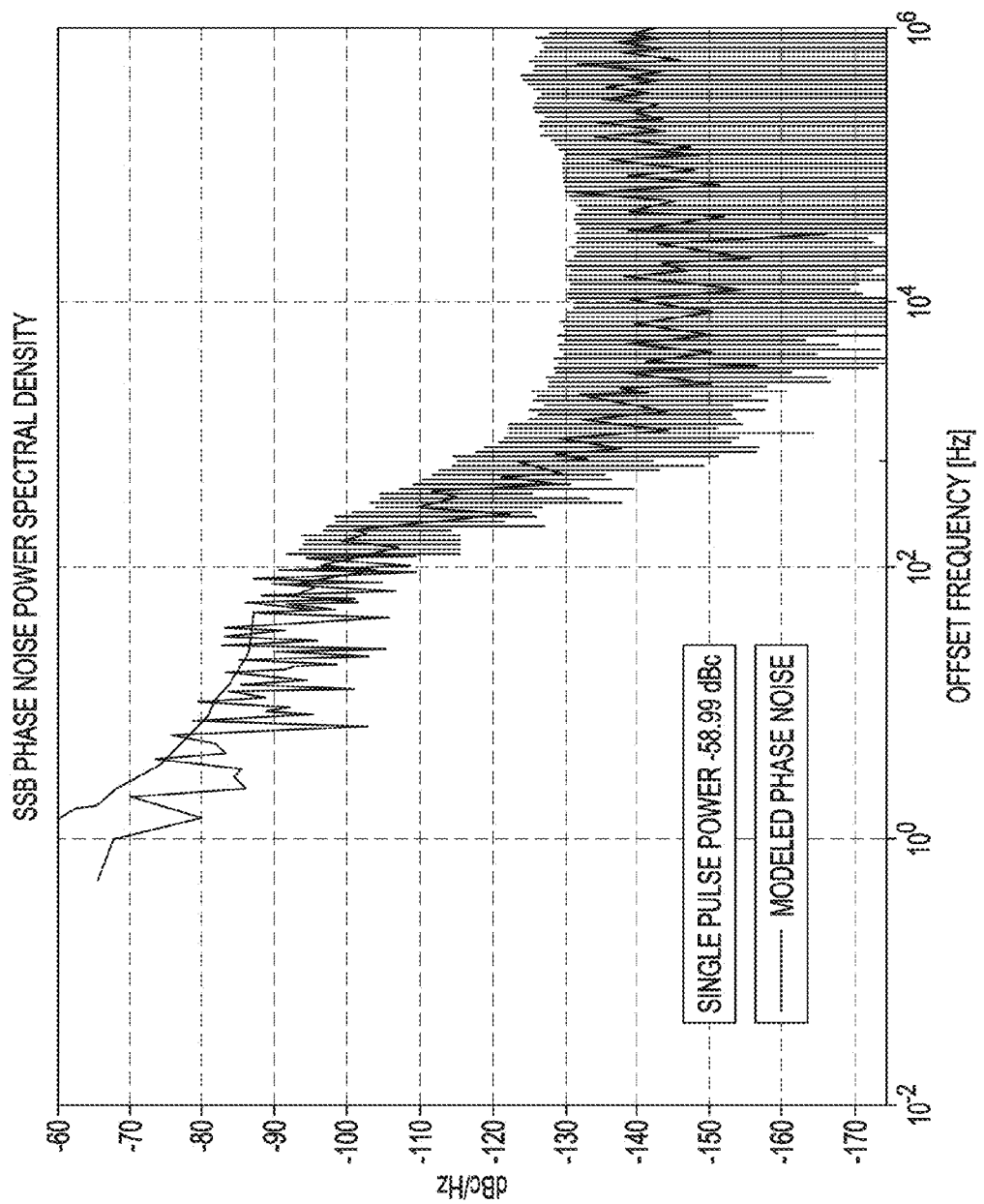
FIG. 3 is another graphical representation of one embodiment of the single sideband (SSB) phase noise spectral density as used in these teachings.

An exemplary embodiment of a phase noise power spectral density is shown in FIG. 3.

Figure 4A:
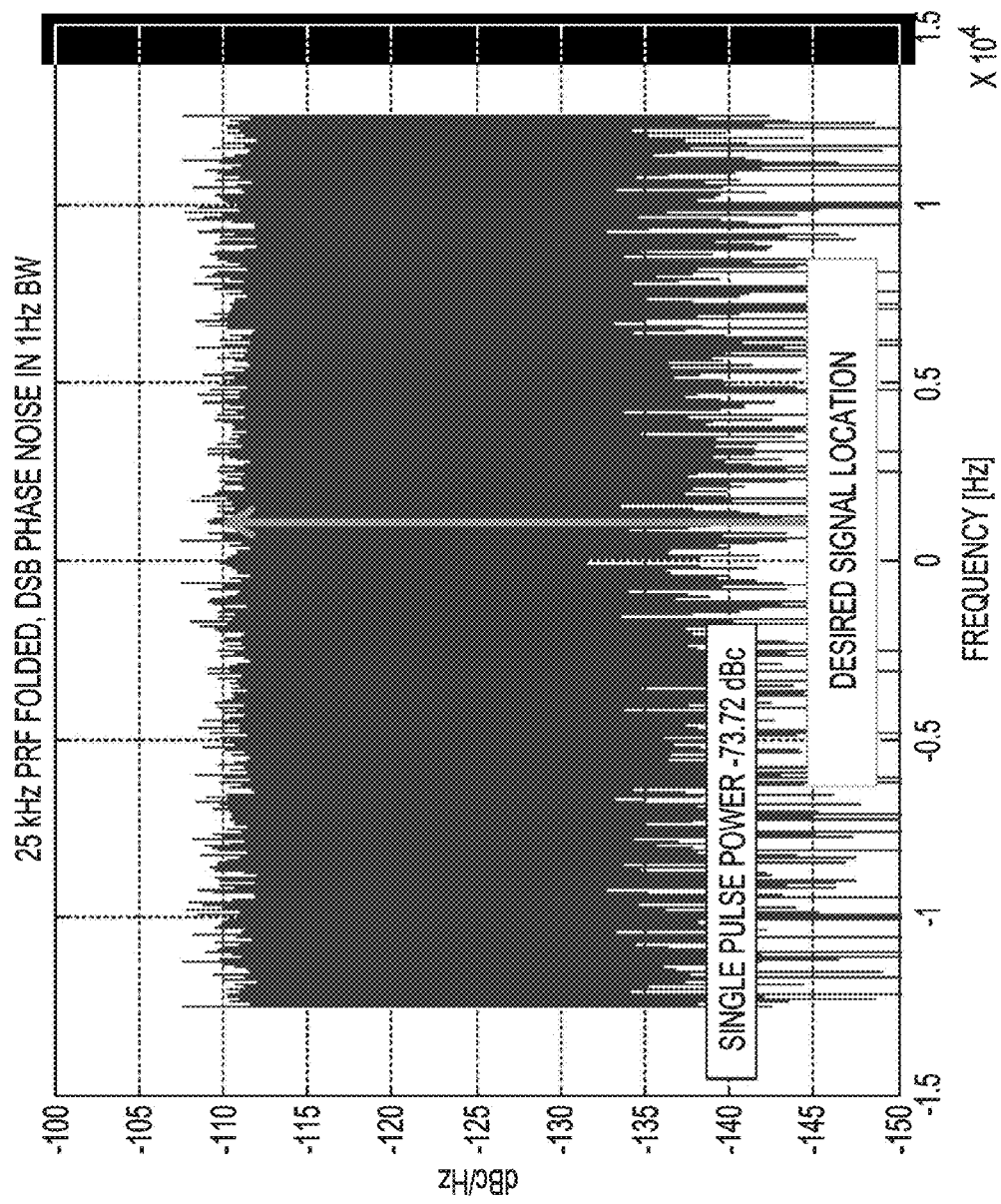
FIGS. 4a-4d are graphical representations of results of embodiments of the method and system of these teachings, depicted in the double sideband (DSB) phase noise spectral density.
Figure 4B:
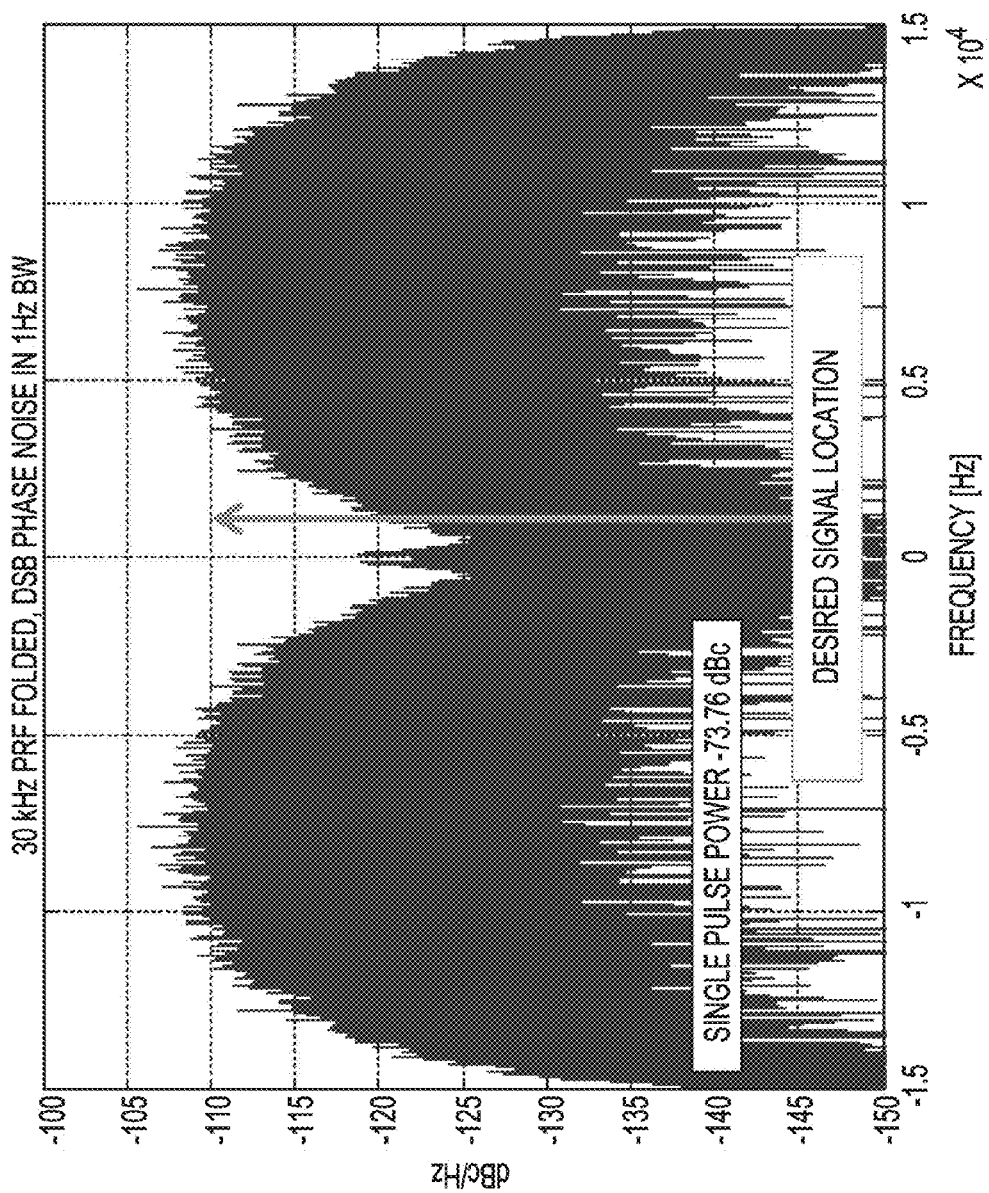

In one exemplary embodiment, in a pulsed Doppler radar system, the range delay is $\tau_{dl}=2r/c=66.7$ μs and the pulse repetition frequency (PRF) should be predetermined as a multiple of 15 kHz. FIG. 4a shows results for a case where a 25 kHz pulse repetition frequency is used. The nulls in the delay function (also referred to as the filter function) do not reduce the effect of phase noise on sensitivity (by increasing the signal to noise ratio). FIG. 4b shows results for the case where the predetermined PRF is 30 kHz. The nulls in the delay function reduce the effect of phase noise on sensitivity. The desired Doppler signal location is indicated in FIGS. 4a-5b.

Figure 4C:
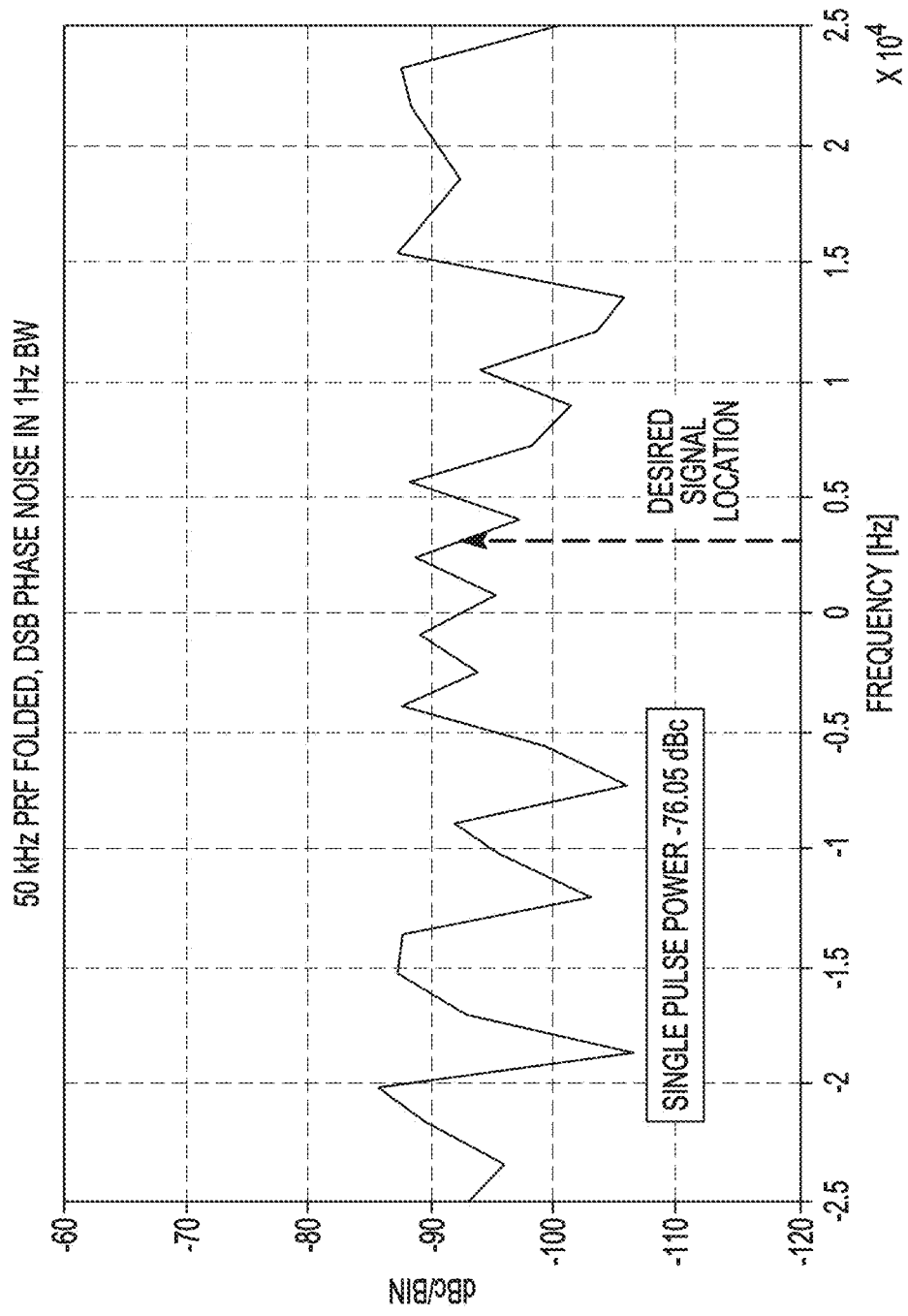
Figure 4D:
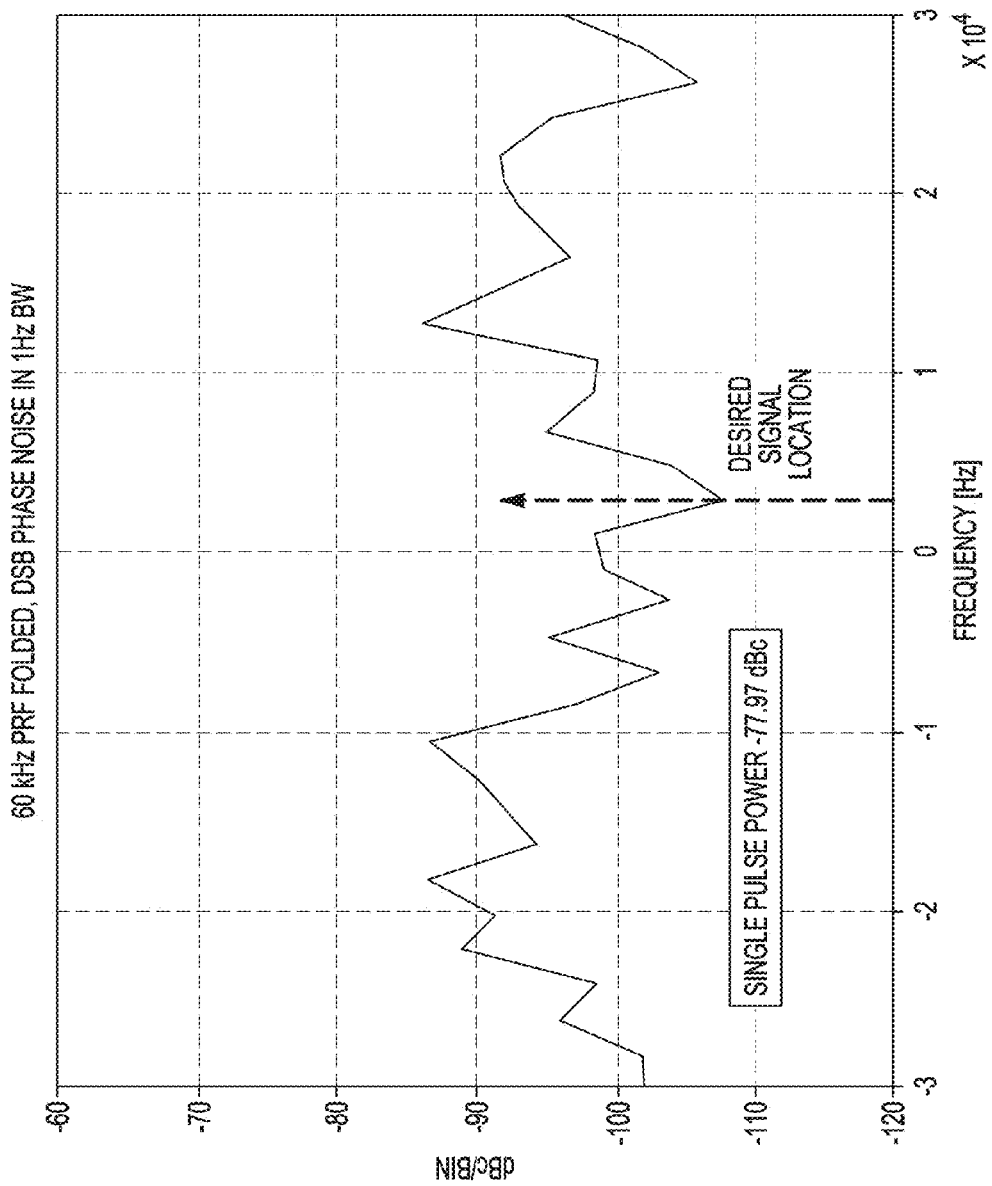

In another exemplary embodiment, in a pulsed Doppler radar system, the range delay is $\tau_{dl}=2r/c=33.3$ μs and the pulse repetition frequency (PRF) should be predetermined as a multiple of 30 kHz. FIG. 4c shows results for the case where a 50 kHz PRF is used. The nulls of the delay function do not reduce the effect of phase noise on sensitivity. When a predetermined PRF of 60 kHz is used, as shown in FIG. 4d, the nulls of the delay function reduce the effect of phase noise on radar sensitivity.

Figure 5A:
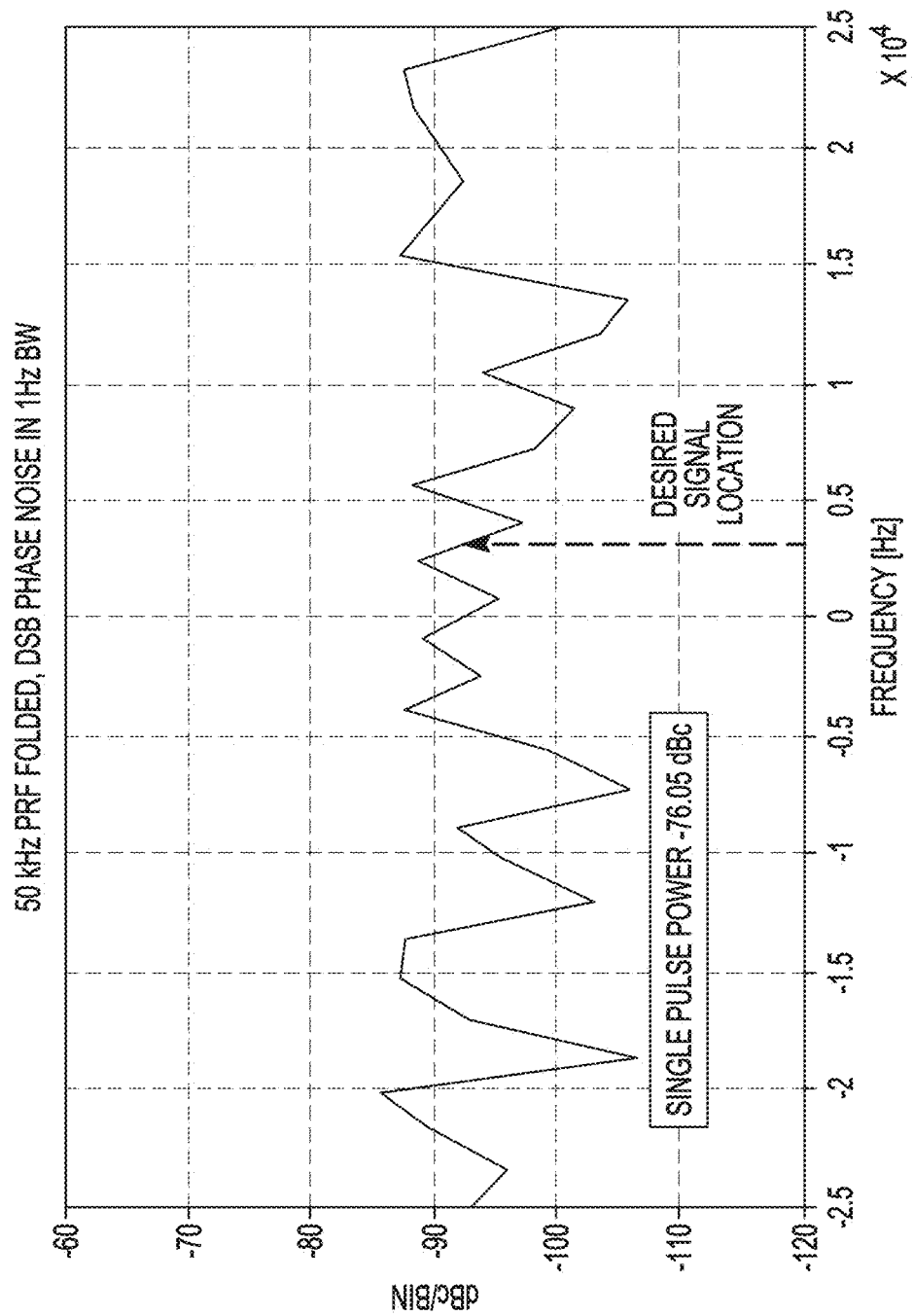
FIGS. 5a-b shows graphical representations of results of another embodiment of the method and system of these teachings.
Figure 5B:
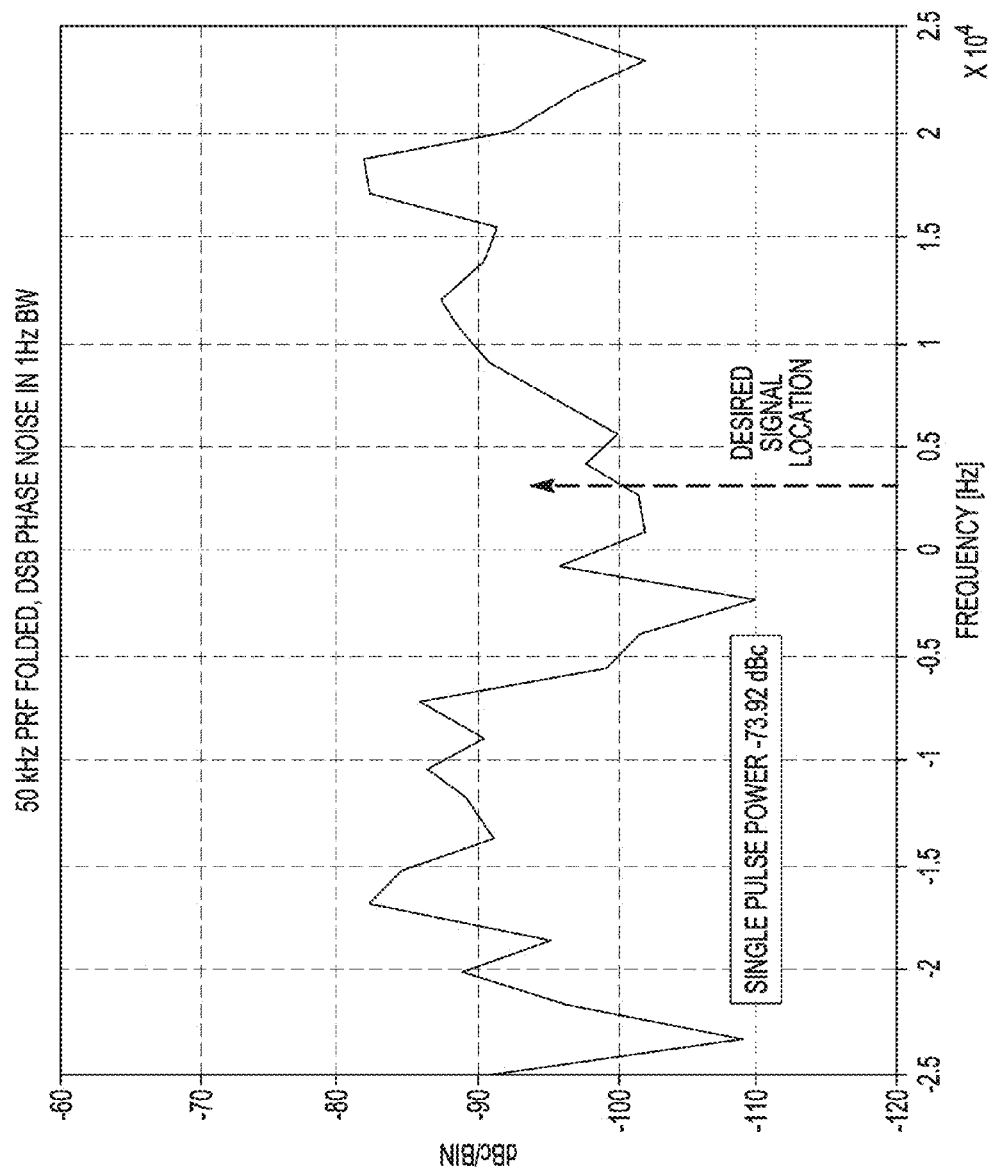

In yet another exemplary embodiment, for the same configuration as in FIG. 4c, the nulls in the delay function (also referred to as a filter function) are also determined by an additional time delay, where a sum of the additional time delay and a time delay corresponding to the predetermined PRF is a multiple of a predetermined system delay time. As shown in FIG. 5, when a predetermined PRF of 50 kHz is used and an additional delay of 6.6 μs is inserted, a reduction of the effect of phase noise on radar sensitivity is obtained.

Figure 6:
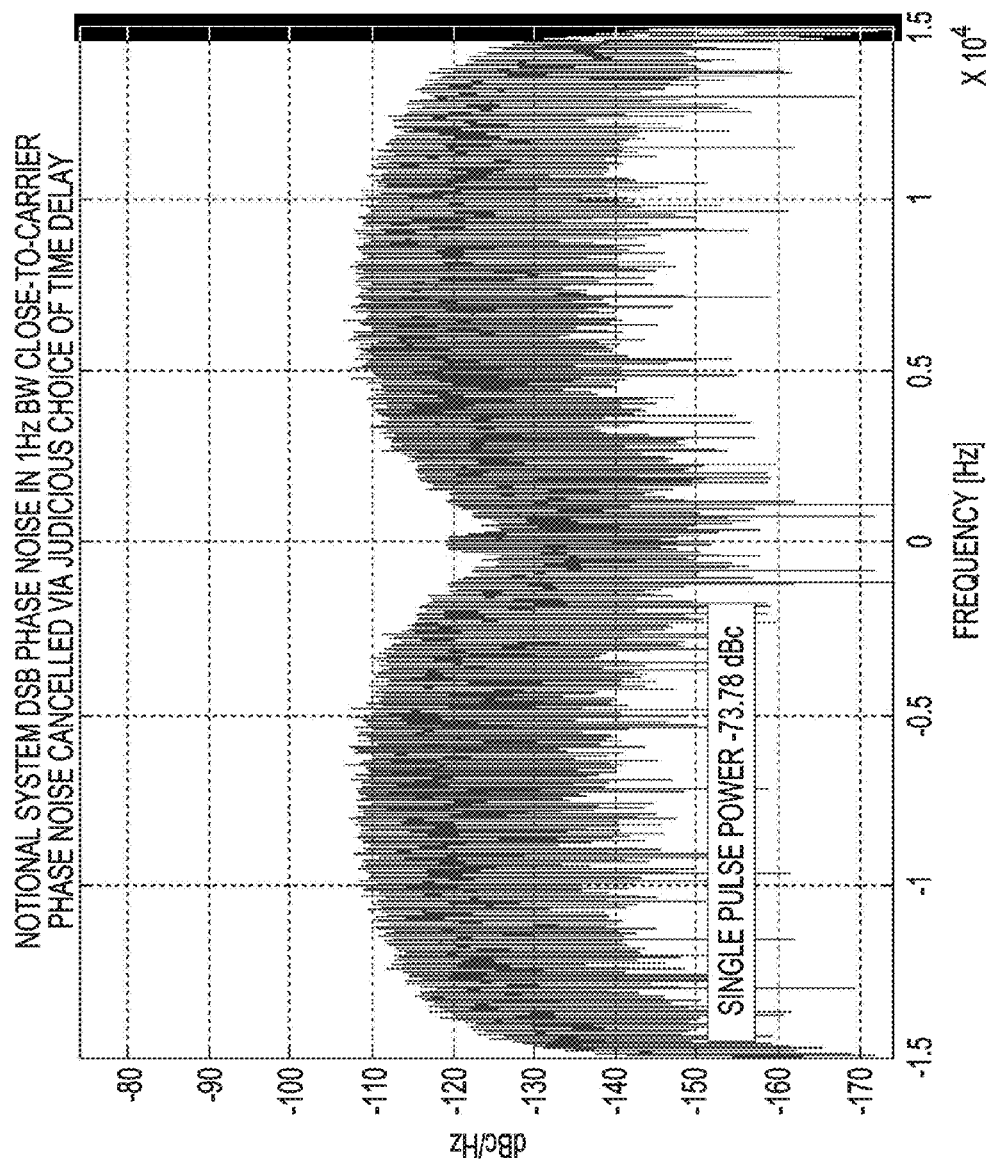
FIG. 6 shows a graphical representation of results of yet another embodiment of the method and system of these teachings.

In still another exemplary embodiment, in a CW Doppler radar system, the nulls in the filter function are determined by selecting a predetermined time delay. As can be seen in FIG. 6, selection of the predetermined time delay so that the total time delay is a multiple of the initial total system time delay results in a reduction of the effect of phase noise on radar sensitivity.

When the phase noise from the oscillator is a significant factor in the signal-to-noise ratio, reducing the effects of phase noise improves system performance.

In one or more embodiments, the pulse Doppler radar system of these teachings includes a transmitter having a pulse train generator providing a predetermined pulse repetition frequency (PRF). The pulse train generator is configured to select the predetermined PRF. The predetermined PRF is selected such that nulls in a filter function multiplying a power spectral density of phase noise are positioned such that portions of the power spectral density of the phase noise are canceled, the portions being selected so that effect of phase noise in radar sensitivity is reduced.

In one instance, the pulse train generator is configured to select a PRF that is a multiple of inverse time delay for a predetermined range. In another instance, the pulsed Doppler radar system also includes a receiver having an additional predetermined time delay component, where a sum of an additional predetermined time delay and a time delay corresponding to the predetermined PRF is a multiple of a predetermined system delay time.

A component is configured to perform the function by the design of the component or by having instructions, such as computer readable code in one exemplary embodiment, stored in a non-transitory memory or computer usable medium, where execution of the instructions causes a circuit or subcomponent to perform the function. In one exemplary embodiment, the circuit or subcomponent is one or more computational processors. In another exemplary embodiment, the circuit is part of an Application Specific Integrated Circuit (ASIC) or a Field Programmable Gate Array (FPGA).

Figure 7:
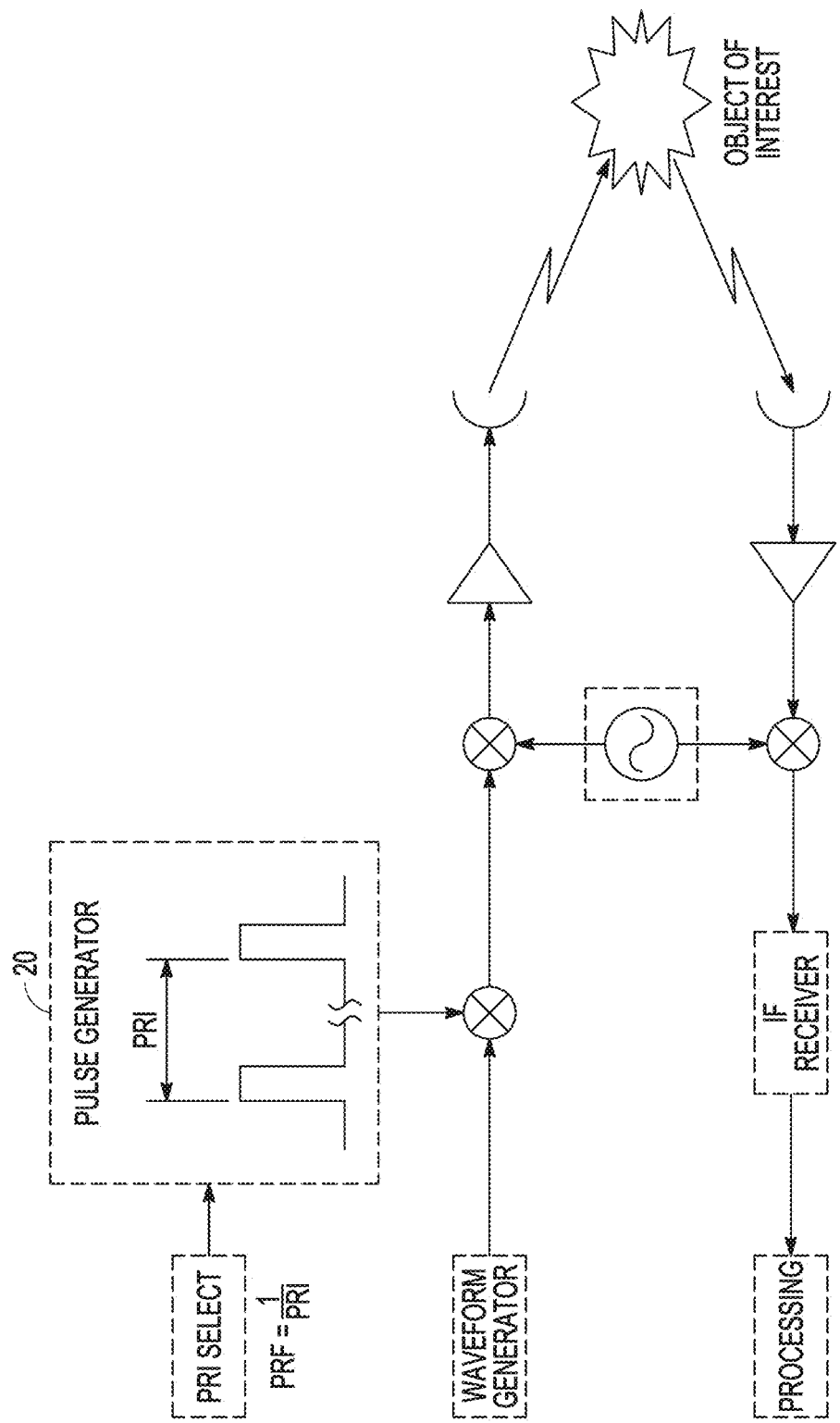
FIG. 7 is a block diagram representation of one embodiment of the pulsed Doppler system of these teachings.

FIG. 7 shows one embodiment of the pulsed Doppler radar of these teachings where the pulse train generator 20 is configured to select the predetermined PRF so that that nulls in a filter function multiplying a power spectral density of phase noise are positioned such that portions of the power spectral density of the phase noise are canceled, the portions being selected so that effect of phase noise in radar sensitivity is reduced, In one instance, the pulse train generator 20 is configured to select a PRF that is a multiple of inverse time delay for a predetermined range. It should be noted that, in FIG. 7, the pulsed train generation and the PRF selection are described in terms of the pulse repetition interval (PRI). The PRF and the PRI are related by $$PRF = \frac{1}{PRI}.$$

Figure 8:
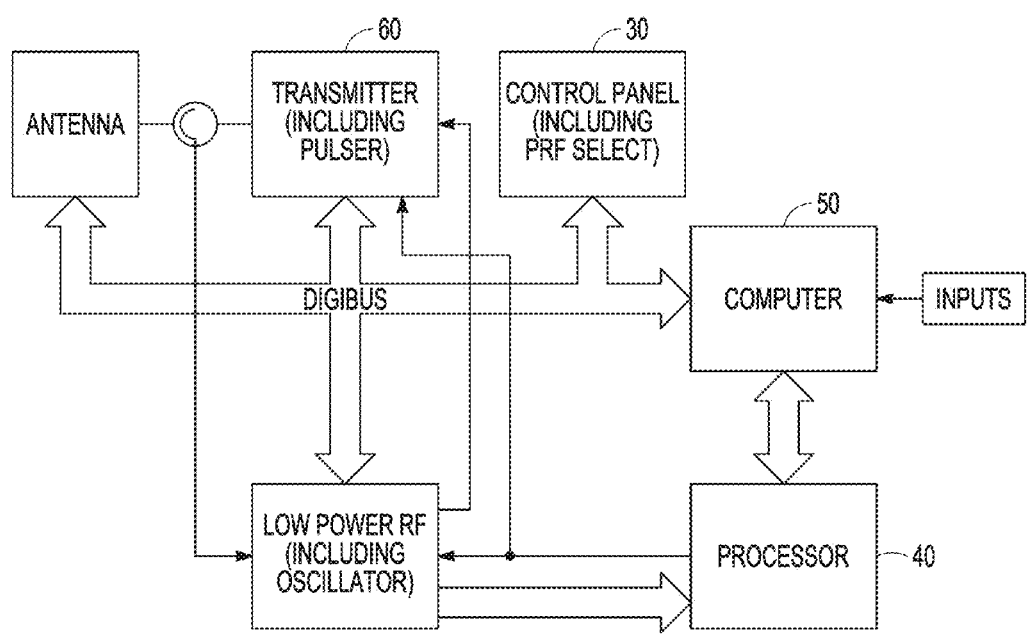
FIG. 8 is a block diagram representation of another embodiment of the pulsed Doppler system of these teachings.

FIG. 8 shows a more detailed embodiment of the pulsed Doppler radar of these teachings in which a control panel 30 enables selection of the predetermined PRF. The control part 30 is in communication with the computer 50 and the processor 40. The processor 40 provides triggers and timing information to the transmitter 60, which includes pulse generating components, so that the predetermined PRF is selected and provided.

Figure 9:
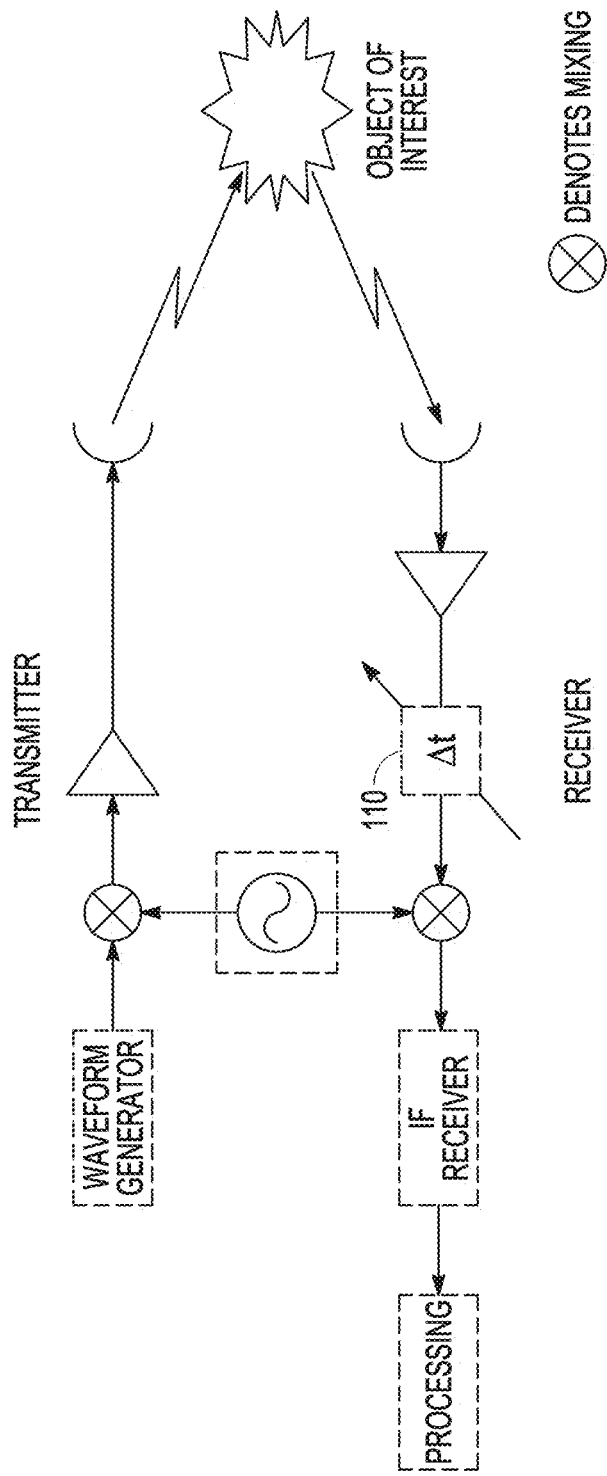
FIG. 9 is a block diagram representation of one embodiment of the continuous wave (CW) Doppler system of these teachings.

The embodiments of FIG. 7 or 8 can include a time delay component 110 as in FIG. 9. Adding the time delay component 110 to the receiver in the pulse Doppler radar resulting in an embodiment in which the pulsed Doppler radar system also includes a receiver having an additional predetermined time delay component, where a sum of an additional predetermined time delay and a time delay corresponding to the predetermined PRF is a multiple of a predetermined system delay time.

In one or more embodiments, the CW Doppler radar receiver system of these teachings includes a predetermined time delay component at a receiver input, the predetermined time delay component being selected such that nulls in a filter function multiplying a power spectral density of phase noise are positioned such that portions of the power spectral density of the phase noise are canceled. The portions are selected so that effect of phase noise in radar sensitivity is reduced.

FIG. 9 shows a schematic block diagram representation of one embodiment of the CW Doppler radar receiver system of these teachings. Referring to FIG. 9, an adjustable time delay component 110 is connected to the receiver's input. The time delay is selected such that that nulls in a filter function multiplying a power spectral density of phase noise are positioned such that portions of the power spectral density of the phase noise are canceled. The portions are selected so that effect of phase noise in radar sensitivity is reduced. The time delay from time delay component 110 is selected such that the effect of phase noise on signal-to-noise ratio is reduced, as shown in one exemplary embodiment in FIG. 6.

In one embodiment, the CW Doppler radar receiver system of these teachings includes a number of time delay components, where a received signal is divided between each time delay component from the number of time delay components. An output of each time delay component is provided to one matched filter receiver from a number of matched filter receivers. A selection component is configured to receive an output from each matched filter receiver and to select a matched filter receiver that provides a best signal to noise ratio.

Figure 10:
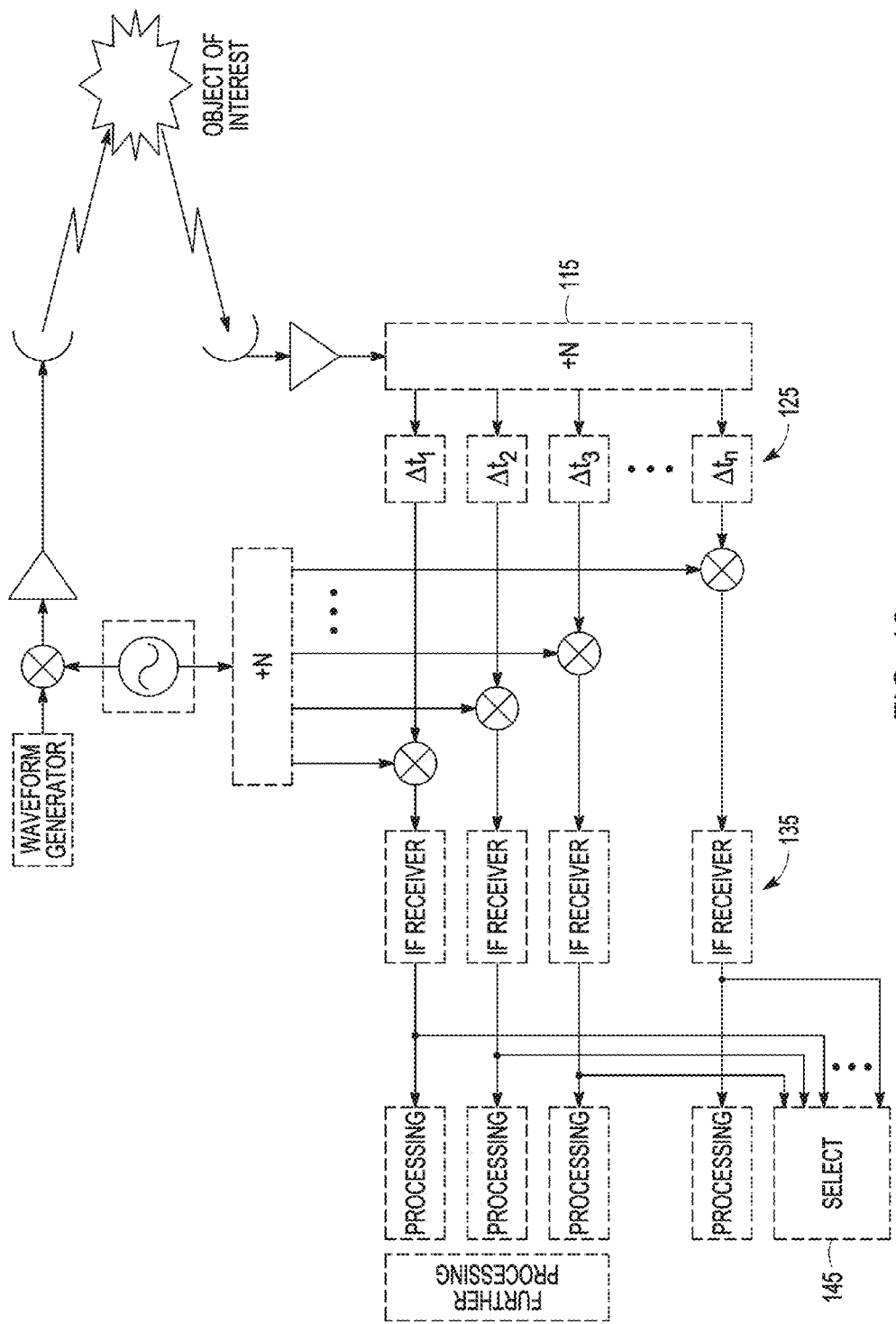
FIG. 10 represents a block diagram representation of another embodiment of the CW Doppler system of these teachings.

FIG. 10 shows a schematic block diagram representation of another embodiment of the CW Doppler radar receiver system of these teachings. Referring to FIG. 10, in the embodiment shown therein, a divider 115 divides the received signal into a number of signals and each divided signal is provided to one time delay component from a number of time delay components 125. Each divided signal, after being time delayed, is processed by one matched filter receiver from a number of matched filter receivers 135. A selection component 145 is configured to receive an output from each matched filter receiver 135 and to select a matched filter receiver plus that provides a best signal to noise ratio (from the signal to noise ratios from each of the matched filter receivers 135).

The following is a disclosure by way of example of a device configured to execute functions (hereinafter referred to as computing device) which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least include a computing device. The computing device may include an interconnect (e.g., bus and system core logic), which can interconnect such components of a computing device to a data processing device, such as a processor(s) or microprocessor(s), or other form of partly or completely programmable or pre-programmed device, e.g., hard wired and or ASIC customized logic circuitry, such as a controller or microcontroller, a digital signal processor, or any other form of device that can fetch instructions, operate on pre-loaded/pre-programmed instructions, and/or followed instructions found in hard-wired or customized circuitry to carry out logic operations that, together, perform steps of and whole processes and functionalities as described in the present disclosure.

In this description, various functions, functionalities and/or operations may be described as being performed by or caused by software program code to simplify description. However, those skilled in the art will recognize what is meant by such expressions is that the functions result from execution of the program code/instructions by a computing device as described above, e.g., including a processor, such as a microprocessor, microcontroller, logic circuit or the like. Alternatively, or in combination, the functions and operations can be implemented using special purpose circuitry, with or without software instructions, such as using ASIC or FPGA, which may be programmable, partly programmable or hard wired. The ASIC logic may be such as gate arrays or standard cells, or the like, implementing customized logic by metallization(s) interconnects of the base gate array ASIC architecture or selecting and providing metallization(s) interconnects between standard cell functional blocks included in a manufacturer's library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory or external (to the microprocessor) memory such as main memory, or a disk drive or external to the computing device, such as a remote memory, a disc farm or other mass storage device, etc. Commercially available microprocessors, one or more of which could be a computing device or part of a computing device, include a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation as examples.

The interconnect in addition to interconnecting devices such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The interconnect may include one or more buses connected to one another through various bridges, controllers and/or adapters. In one embodiment the I/O controller includes a Universal Serial Bus (USB) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile Random Access Memory (RAM), typically implemented as dynamic RAM (DRAM) which requires power continually in order to refresh or maintain the data in the memory, and non-volatile Read Only Memory (ROM), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application. At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instance of time.

In general, a tangible machine readable medium includes any tangible mechanism that provides (i.e., stores) information in a form accessible by a machine (i.e., a computing device, which may be included, e.g., in a communication device, a network device, a personal digital assistant, a mobile communication device, whether or not able to download and run applications from the communication network, such as the Internet, e.g., an iPhone, Blackberry, Droid or the like, a manufacturing tool, or any other device including a computing device, comprising one or more data processors, etc.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the invention has been described with respect to various embodiments, it should be realized these teachings are also capable of a wide variety of further and other embodiments within the spirit and scope of the appended claims.

What is claimed is:

1. A method for increasing sensitivity of Doppler radar receivers, the method comprising:
    transmitting at a transmitter a predetermined pulse repetition frequency (PRF) that is a multiple of inverse time delay for a predetermined range from a target of interest to position nulls in a filter function multiplying a power spectral density of phase noise to cancel portions of the power spectral density of the phase noise;
    the portions of the power spectral density of the phase noise being selected so that effect of phase noise in radar sensitivity is reduced.

2. The method of claim 1 wherein the nulls in the filter function are also determined by an additional time delay, wherein a sum of the additional time delay and a time delay corresponding to the predetermined PRF is a multiple of a predetermined system delay time.

3. The method of claim 1 wherein the Doppler radar receivers are CW Doppler radar receivers; and wherein the nulls in the filter function are determined by selecting a predetermined time delay.

4. A pulsed Doppler radar system comprising:
   a transmitter comprising a pulse train generator providing a predetermined pulse repetition frequency (PRF);
   the pulse train generator being configured to select the predetermined PRF;
   wherein the pulse train generator is configured to select the predetermined PRF that is a multiple of inverse time delay for a predetermined range from a target of interest, such that nulls in a filter function multiplying a power spectral density of phase noise are positioned such that portions of the power spectral density of the phase noise are canceled;
   said portions being selected so that effect of phase noise in radar sensitivity is reduced.

5. The pulsed Doppler radar system of claim 4 further comprising a receiver comprising an additional predetermined time delay component; wherein a sum of an additional predetermined time delay and a time delay corresponding to the predetermined PRF is a multiple of a predetermined system delay time.

6. A CW Doppler radar receiver system comprising a predetermined time delay component at a receiver input; the predetermined time delay component selected such that a sum of an additional predetermined time delay and a time delay corresponding to a predetermined pulse repetition frequency (PRF), which is a multiple of inverse time delay for a predetermined range from a target of interest, is a multiple of a predetermined system delay time, such that nulls in a filter function multiplying a power spectral density of phase noise are positioned such that portions of the power spectral density of the phase noise are canceled;
said portions being selected so that effect of phase noise in radar sensitivity is reduced.

7. The CW Doppler radar receiver system of claim 6 further comprising:
   at least one other predetermined time delay component, constituting a plurality of time delay components;
   wherein a received signal is divided between each time delay component from the plurality of time delay components;
   an output of each time delay component being provided to one matched filter receiver from a plurality of matched filter receivers; and
   a selection component configured to receive an output from each matched filter receiver and to select a matched filter receiver from the plurality of matched filter receivers that provides a best signal to noise ratio.

\* \* \* \* \*

UNITED STATES PATENT AND TRADEMARK OFFICE
CERTIFICATE OF CORRECTION

PATENT NO. : 9,864,044 B2
APPLICATION NO. : 14/314331
DATED : January 9, 2018
INVENTOR(S) : Lucas et al.

Page 1 of 1

It is certified that error appears in the above-identified patent and that said Letters Patent is hereby corrected as shown below:

On the Title Page

On page 2, in Column 2, item (56), under "Other Publications", Line 1, delete "An/APG-66" and insert --AN/APG-66-- therefor In the Specification In Column 2, Lines 43-44, delete "$\frac{t_d}{2}$ to $\pm \frac{t_d}{2}$." and insert -- $-\frac{t_d}{2}$ to $+\frac{t_d}{2}$ -- therefor In Column 4, Line 48, delete "that that" and insert --that-- therefor In Column 4, Line 53, delete "reduced," and insert --reduced.-- therefor In Column 5, Line 27, delete "that that" and insert --that-- therefor Signed and Sealed this
Fifth Day of May, 2020

Andrei Iancu
*Director of the United States Patent and Trademark Office*